Jan. 24, 1956

A. G. CALO 2,731,851

WORK LOCATING DEVICE

Filed March 4, 1953

INVENTOR
ARMAND G. CALO
BY
George H. Kennedy
ATTORNEY

Jan. 24, 1956  A. G. CALO  2,731,851
WORK LOCATING DEVICE
Filed March 4, 1953  4 Sheets-Sheet 3
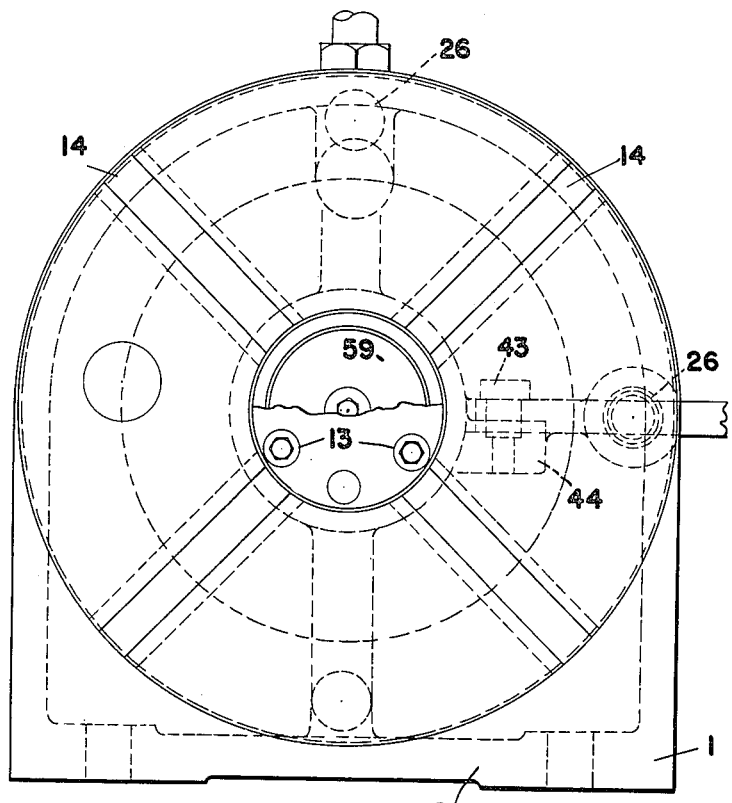
Fig. 4.
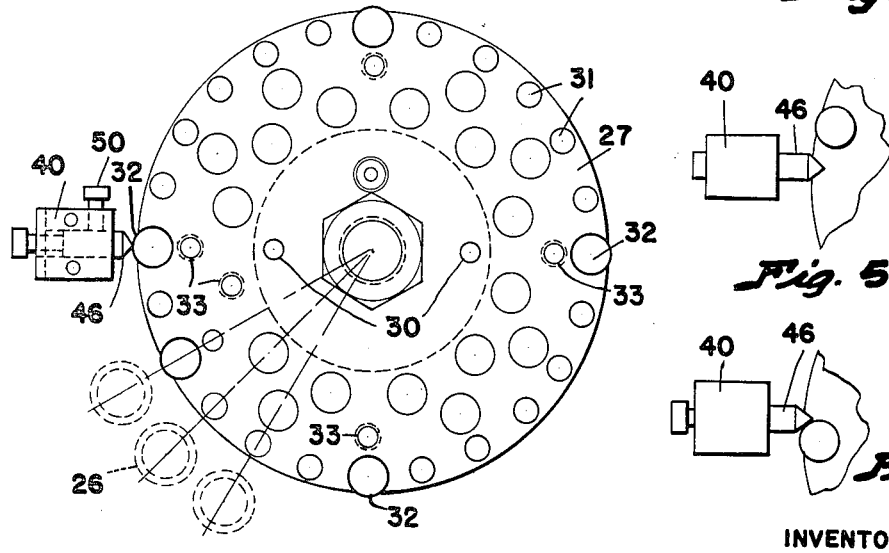
Fig. 5.
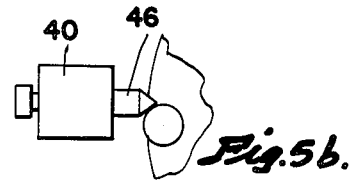
Fig. 5a.
Fig. 5b.
INVENTOR
ARMAND G. CALO
BY
George H. Kennedy Jr.
ATTORNEY Jan. 24, 1956

A. G. CALO 2,731,851

WORK LOCATING DEVICE

Filed March 4, 1953

INVENTOR
ARMAND G. CALO

BY
George H. Kennedy Jr.
ATTORNEY

2,731,851
Patented Jan. 24, 1956

2,731,851
WORK LOCATING DEVICE

Armand G. Calo, Shrewsbury, Mass., assignor to Johnson & Bassett, Inc., Worcester, Mass., a corporation of Massachusetts Application March 4, 1953, Serial No. 340,261

7 Claims. (Cl. 74—527)

The present invention relates to work locating devices and has for its object to provide an improved indexing mechanism adapted to be employed in conjunction with a work holder for angularly positioning a workpiece.

The work locating device of the present invention is of a portable nature so that it may be utilized with various machine tools to positively locate a work holder in different angularly adjusted indexed positions which may be selected at the will of the operator in advance of the performance of a series of successive machining operations on the same workpiece. The selective indexing mechanism of the present invention is particularly characterized by its simplicity of construction and accessibility for the operator in setting up a series of selector elements which serve to successively position a workpiece through predetermined and adjustable extents of angular movement with respect to an axis about which the device is turnable.

The above and other advantageous features of the invention will hereinafter more fully appear from the following description, considered in connection with the accompanying drawings, in which, Fig. 1 is a view partially in side elevation and partially in vertical section of a work locating device embodying the present invention.

Fig. 4 is a view in end elevation of the device of Fig. 1, as viewed from the left.

Fig. 5 is a view in end elevation of the selector plate of the device of Fig. 1, as viewed from the right.

Figs. 5a and 5b are fragmentary views illustrating the functioning of the selector plate in different positions.

Figure 1:
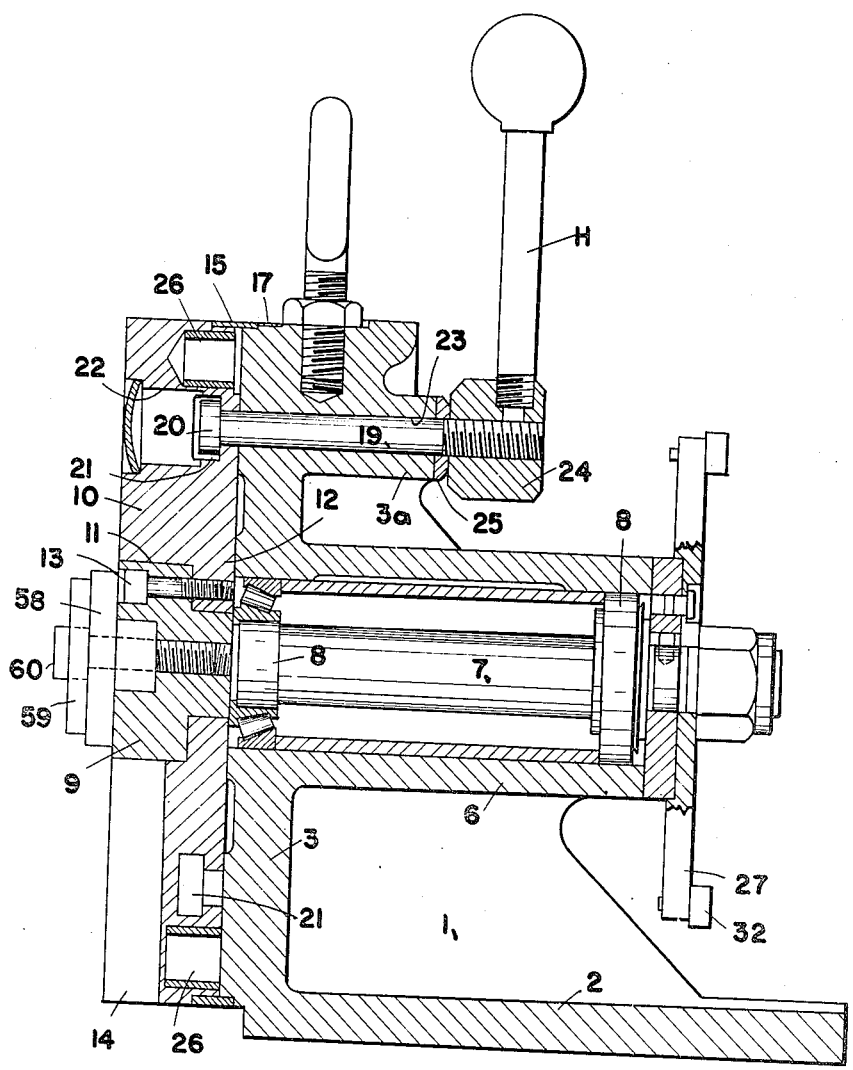
Figure 2:
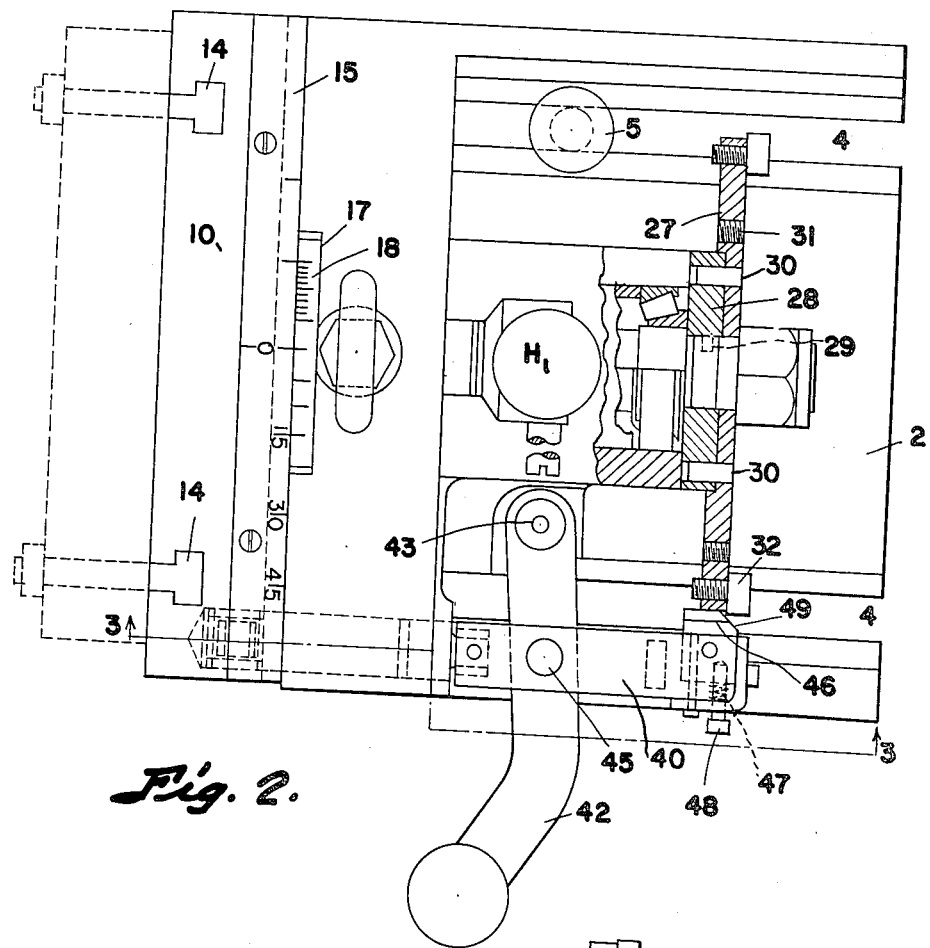
Fig. 2 is a plan view of the device shown in Fig. 1.

Referring first to Fig. 1, the device consists of a base 1 having a horizontal flange portion 2 for supporting the device on any suitable flat surface so that a second flange portion 3 will extend vertically. In order to secure the base 1 in position, the flange portion 2 provides a pair of slots 4, which, as best shown in Fig. 2, are adapted to receive holding devices, such as bolts 5, arranged to fit within the grooves usually provided in the top of a machine tool table. In this way, the base 1 and the entire work locating assembly carried thereby may be mounted and secured in position with reference to the work cutting element of a machine tool, such as a drill.

The base 1 further provides a housing 6 extending at right angles to the flange portion 3 and a shaft 7 is rotatably supported within the housing 6 by bearings 8. The left-hand end of the shaft 7 extends beyond the bearing housing 6 and provides an enlarged head portion 9 on which is mounted an index plate 10.

The plate 10 provides a central opening 11 surrounded by a flange 12 which fits on the shoulder adjacent to the head 9 of the shaft 7, with the plate 10 being secured in position on the head by means of screws 13. The plate 10 is thus turnable with the shaft 7 and provides means for the support of a workpiece in any desired angular position with reference to the longitudinal axis of the shaft 7. For the purpose of mounting a workpiece on the plate 10, the front face thereof provides a number of slots 14 extending radially from the axis of the shaft 7, as best shown in Fig. 4. These slots 14 are of the undercut type, as shown in Fig. 2 so as to slidably receive and hold suitable devices for clamping a workpiece in position on the plate 10, as indicated in dotted lines.

In order to indicate the location of the plate 10 in various angular positions with reference to the axis of the shaft 7, the outer edge of the plate 10 provides a scale ring 15 having a plurality of graduated scale markings running from zero to three hundred and sixty degrees. The scale ring 15 cooperates with a vernier plate 17 secured to the flange 3 of the base 1 having a zero mark at its middle and graduated vernier markings 18 on either side thereof to assist in accurately reading the angular position of the plate 10 with reference to any marking when setting up a workpiece attached to the plate 10.

The plate 10 may be clamped in any predetermined angular position with reference to the base 1 by means of a clamping device which comprises a bolt 19 having its head 20 received in a circular T-slot 21 formed in the rear face of the plate 10. The bolt 19 is insertable through an opening 22 at the front of the plate 10 so as to extend freely through an opening 23 formed in a boss 3a provided by the flange 3. The end of the bolt 19 which projects beyond the boss 3a is threaded to receive a hub 24 so by turning the hub on the bolt 19 in a clockwise direction it is caused to engage a washer 25 surrounding the bolt at the end of the boss 3a and thereby exert a pull on the bolt. The resulting movement of the bolt to the right engages the bolt head 20 with the sides of the slot 21 and forces the plate 10 against the face of the flange 3 to hold it in position with a clamping action. For convenience in operating the clamping device, the hub 24 provides a handle H whereby it may be turned in either direction to tighten or loosen the bolt head 20 within the slot 21, as may be desired.

The parts of the mechanism described thus far provide means for supporting a workpiece on the plate 10 in any desired angular relation with respect to the horizontal axis of the shaft 7, and clamping it in this position for operation upon by a cutting element, such as the drill of a machine tool. Should it be desired to drill additional openings in the same workpiece at different angles with respect to the first opening, the handle H is turned in a counterclockwise direction to unclamp the plate 10. This permits free rotation of the plate 10 with the shaft 7 into a different angular setting which will be indicated by the reading of the markings 16 and 18 on the scale ring 15 and vernier plate 17, respectively.

As previously pointed out, the object of the present invention is to provide a selective indexing mechanism which will make it possible to successively position a workpiece on the plate 10 through predetermined and variable extents of angular movement. For this purpose, the rear face of the plate 10 provides a series of indexing holes 26 adjacent to its outer periphery, with the holes 26 being spaced apart at regular intervals, as indicated in dotted lines in Fig. 4. It is to be noted that the intervals between the holes 26, as measured along the periphery of the plate 10 correspond with the intervals between the scale markings 16 on the ring 15. For purposes of illustration this interval is shown as subtending an angle of fifteen degrees, although, of course, a different interval may be employed if desired.

The indexing holes 26 in the plate 10 are located very accurately, with the centers of the holes 26 spaced apart exactly in accordance with the chosen angular interval, as stated above. Therefore, the holes 26 provide means for positively locking the plate 10 in any one of a large number of different work supporting positions with a definite angular displacement therebetween, and the present invention provides a selective indexing mechanism cooperating with the plate 10. By the employment of this selective mechanism, the operator of the machine tool is enabled to predetermine successive machining positions for the workpiece, so that tool cuts may be produced therein with the desired angular relation therebetween.

Referring now to Figs. 2 and 5, the indexing mechanism is shown as further comprising a selector plate 27 which is mounted on the right-hand end of the shaft 7 through its attachment to an end cap 28. A key 29 secures the end cap 28 to the shaft 7 and the plate 27 is secured to the cap 28 by dowel pins 30 which are located on opposite sides of the axis of the shaft 7. The selector plate 27 is therefore adapted to turn with the index plate 10 on which the workpiece is mounted.

The selector plate 27 provides a series of holes 31 adjacent to its outer periphery, with the holes 31 being spaced apart at regular intervals. It is to be noted that the intervals between the holes 31 as measured around the periphery of the plate 27 subtend an angle of fifteen degrees which intervals correspond with the intervals between the indexing holes 26 in the plate 10 and between the scale markings 16 on the ring 15.

The holes 31 on the selector plate 27 are threaded so that each hole may receive the threaded end of a selector button 32. When the indexing device is not in use, these buttons 32 are mounted in a series of threaded holes 33 provided in the plate 27 within the outside series of holes 31. The number of buttons 32 corresponds to the number of holes 31, so that the buttons 32 can be removed individually from their storing holes 33 and placed within the holes 31 in any desired arrangement around the periphery of the selector plate 27. The diameter of each button 32 is such that it projects slightly beyond the periphery of the plate 27 and a button 32 located in any selected hole 31 will have an angular setting corresponding to one of the scale markings 16 on the ring 15 of the plate 10.

As previously pointed out, the rear face of the plate 10 provides a series of holes 26 corresponding in number and in angular displacement to the series of holes 31 on the selector plate 27. Furthermore, when the plate 27 is secured to the cap 28 by the pins 30, the two series of holes 26 and 31 will lie in pairs along a series of lines radiating from the central axis of the shaft 7, as indicated by the dot and dash lines in Fig. 5.

Figure 3:
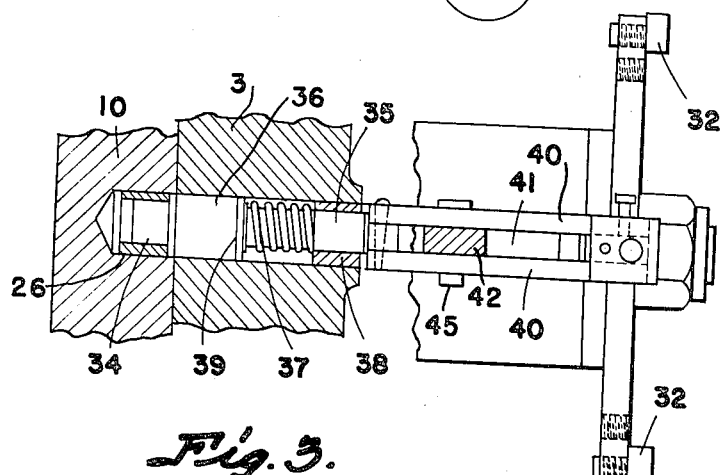
Fig. 3 is a fragmentary sectional view along the line 3—3 of Fig. 2, looking in the direction of the arrows.

The holes 26 in the plate 10 are for the purpose of receiving the reduced end 34 of a locking plunger 35, which, as best shown in Fig. 3, is slidably mounted within an opening 36 extending horizontally through the flange 3 of the base 1. The plunger 35 is yieldably maintained with its end 34 in a hole 26 by means of a spring 37 surrounding the plunger between a fixed collar 38 secured to the flange 3 within the hole 36 and a shoulder 39 on the plunger.

The plunger 35 extends beyond the face of the flange 3 and is connected to an operating link 40 having a slot 41 therein through which extends a lever 42, the inner end of which is mounted to turn on a pivot 43 supported by a lug 44 projecting from the housing 6, as best shown in dotted lines in Fig. 4. The lever 42 is connected to the link 40 by a pin 45, so that by turning the lever on its pivot 43 the end 34 of the plunger 35 can be withdrawn from the particular hole 26 in which it is then held by the pressure of the spring 37. When this occurs, the index plate 10 and the selector plate 27 can be turned in unison about the axis of the shaft 7, assuming that the clamping handle H has been turned previously to release the clamping bolt 19. The degree of such turning is determined by the arrangement of indexing buttons 32 on the plate 27 and their cooperation with a selector finger 46 located at the end of the link 40.

As best shown in Fig. 2, the finger 46 is slidably mounted at the end of the link 40 so as to move at right angles thereto, with a spring 47 serving to press the finger outwardly until the head of a guide pin 48 engages the side of the link. Therefore, when the lever 42 occupies the position of Fig. 2 with the end of the plunger 35 in a hole 26, the spring 47 is slightly compressed since the finger 46 is at that time bearing on the smooth outer periphery of the plate 27. This is the normal position of the plunger 35 at the end of a cutting operation performed on a workpiece while maintained in an angular setting determined by the particular location of the button 32 that has previously actuated the plunger 35 to lock the plate 10 in an indexed position.

When it is desired to again index the workpiece for the performance of another cutting operation thereon at a different angle, the lever 42 is moved to the right as viewed in Fig. 2, thereby withdrawing the inner end 34 of the plunger 35 from the hole 26. As this movement of the plunger occurs, the finger 46 will be forced radially outward against the pressure of the spring 47 as an inclined surface 49 of the finger rides on the edge of a button 32. At this point the end of the finger 46 is still riding on the surface of the button 32, see Fig. 5, and it is now possible to free the finger from the button by imparting a very slight turning movement to the plate 27. When this occurs, the finger 46 will be free to move radially inward under the pressure of the spring 47 until the end thereof overhangs the face of the plate 27, as indicated in Fig. 5a.

The finger 46 will then prevent the plunger 35 from moving inwardly under the pressure of the spring 37, leaving the plates 10 and 27 free to turn to position the workpiece in a new angular setting which is determined by the location of the next button 32 in one of the holes 31. In Fig. 5, the next button is shown as being displaced an angle of thirty degrees from the button which has previously been moved from engagement with the finger following the turning of the lever 42.

Fig. 5b illustrates the indexing action which occurs when the plate 27 is manually turned in a clockwise direction from the position of Fig. 5a to engage the next button 32 with the pointed end of the finger 46. As previously noted, this button 32 is displaced by an angle of thirty degrees from the button with which the finger 46 has previously been engaged. Therefore, as this second button 32 moves into a position in which its center is located opposite to the center line of the finger 46, the finger will be pressed outwardly until its end clears the periphery of the plate 27. This movement of the finger 46 releases the plunger 35 from the holding action of the plate 27, so that the compressed spring 37 immediately shifts the plunger 35 to the left to enter its end 34 in the particular plate opening 26 which lies on the same radius line as the second button 32.

From the foregoing description of the relation between the parts it will be apparent that the buttons 32 can be located in the holes 31 of the selector plate 27 in any desired arrangement in order to cause successive operations to be performed on the workpiece with different angular settings with respect to the axis of the shaft 7. For example, with the buttons 32 arranged as shown in Fig. 5, the plate 10 will be locked in position after it has been turned through an angle of thirty degrees, then sixty degrees, then ninety degrees, then seventy-five degrees, and finally through an angle of one hundred and five degrees to bring the plate back to the starting point. A large number of combinations can be worked out by varying the arrangement of the buttons 32, and all that is required of the operator is to locate the buttons in accordance with the desired sequence of operations, without the necessity of changing any other parts of the indexing mechanism.

Obviously, the interval between the holes 26 and 31, as measured angularly around the peripheries of the plates 10 and 27 can be varied as desired, the fifteen degree angle shown being merely illustrative. Should it be desired to set up the workpiece at an angle which is not an even multiple of the particular angular interval which has been chosen, it is possible to obtain an intermediate setting of the workpiece by employing the markings 16 on the scale ring 15 with reference to the markings 18 on the venier plate 17. When making such adjustments independently of the selector plate 27, it is possible to lock the finger 46 in the extended position of Fig. 5a in which the finger positively holds the plunger 35 out of engagement with any of the holes 26 of the plate 10. For this purpose, a set screw 50 is provided at the end of the link 41 which can be turned down to engage the top of the finger 46 and thereby clamp it in an extended position.

Figure 6:
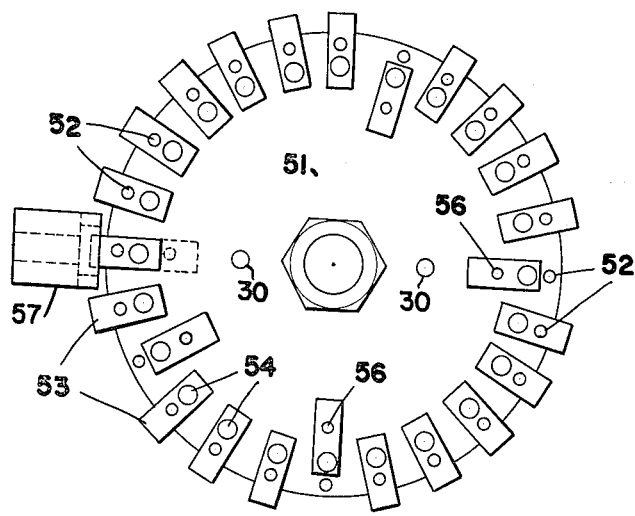
Fig. 6 is a view in end elevation of a modified form of selector plate.
Figure 7:
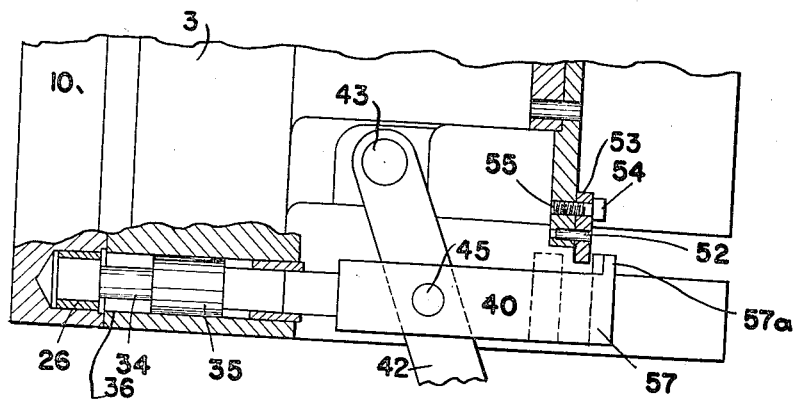
Fig. 7 is a fragmentary plan view of the selector plate of Fig. 6 in association with an indexing plunger.

Referring now to Figs. 6 and 7, there is shown a modified form of selector plate 51 which provides a series of pins 52 spaced around its periphery and separated by angular intervals corresponding to the intervals between the holes 31 in the plate 27. These pins 52 are adapted to cooperate with a series of blocks 53 that are secured to the plate 51 by screws 54 received in threaded openings 55 corresponding in number and in spacing to the pins 52.

Each block 53 provides an opening 56 that is adapted to receive a pin 52 and so lock the block in a predetermined angular position with reference to the axis of shaft 7. When a pin 52 is received in an opening 56, the end of the block will project beyond the periphery of the plate 51. However, should a block 53 be disengaged from a pin 52 and turned around, a gap will be left between this block and the blocks on either side thereof.

In advance of indexing by means of the selector plate 51, the blocks 53 all occupy positions in which they project beyond the periphery of the plate. In this position the blocks will be engaged by the projecting end 57a of a finger 57 movable with the indexing plunger 35, the finger being wider than the space between projecting blocks 53. In Fig. 7 the end of the finger 57 is shown as having been hooked over the projecting end of a block 53 in response to turning the lever 42 to withdraw the plunger 35 from engagement with an indexing hole 26 of the plate 10 and then turning the plate 51 to engage a projecting block with finger 57. However, should any block 53 be mounted so that its opening 56 is out of engagement with a pin 52 as shown in Fig. 6, then the finger 57 will enter the gap between the blocks 53 upon turning the plate 51 to a position in which the finger 57 clears the projecting end of the block with which it was previously in engagement. Fig. 7 shows the finger 57 in dotted lines, as having been moved between the projecting ends of adjacent blocks on either side of any block that has been shifted inwardly. In this position the finger 57 is entirely free of the plate 51 and the plunger 35 will then be free to enter a hole 26 in the plate 10 under the pressure of the spring 37 to lock the plate in position. When using the modified form of selector plate 51, any desired combination can be set up by moving selected blocks 53 inwardly to leave gaps around the periphery of the plate 51 with the desired angular displacement therebetween for indexing the plate 10 in different angular positions. Otherwise, the operation of the indexing mechanism is substantially the same as described above with reference to the plate 27 and the finger 46.

As previously pointed out, a workpiece can be mounted directly on the front face of the plate 10 by means of suitable holding devices cooperating with the slots 14, as indicated in dotted lines in Fig. 2. If desired, a suitable work holding adapter 58 can be mounted on the plate 10 as indicated in Fig. 1. In order to center the adapter 58 with reference to the axis of the shaft 7, a pilot 59 is secured to the outer end of the shaft 7 by means of a set screw 60. The pilot 59 is of cylindrical form so that it can be received in an opening provided in the adapter 58 and center it with respect to the axis of the shaft 7. In Fig. 2, the pilot 59 has been removed to permit mounting of a workpiece on the plate 10.

From the foregoing it is apparent that by the present invention there is provided an improved work locating device characterized by its ability to positively locate a work holder in a series of angularly adjusted positions which may be selected at the will of the operator so that desired machining operations may be successively performed in predetermined positions on the same workpiece. The selective indexing mechanism is further characterized by its simplicity of construction and accessibility for the operator who is able to set up a series of machining operations for performance in angularly adjusted positions by merely locating the selector buttons, or blocks, in accordance with a selected arrangement.

I claim:

1. A work locating device comprising in combination, a base, a shaft rotatably mounted in said base, an index plate attached to one end of said shaft for the support of a workpiece in any one of a number of angularly displaced positions as determined by the location of a series of indexing openings arranged around the periphery of said index plate, a movable locking member slidably mounted on the base for engagement with said indexing openings of said index plate to angularly locate a workpiece thereon and lock it in position, means for moving said locking member into and out of engagement with the indexing openings, a selector plate secured to said shaft at the end opposite to said index plate, with the plane of said selector plate disposed at right angles to the path of movement of said locking member, and a plurality of selector elements mounted on said selector plate and angularly displaced around the periphery thereof to correspond with the location of certain of said indexing openings, said locking member cooperating with said selector elements so that it is engageable only with certain of said indexing openings and so that the workpiece on said index plate may be successively indexed to different angular positions determined by the arrangement of said selector elements.

2. A work locating device comprising in combination, a base, a shaft rotatably mounted on said base, an index plate attached to one end of said shaft for the support of a workpiece in any one of a number of angularly displaced positions as determined by the location of a series of angularly displaced indexing openings arranged around the periphery of said index plate, a movable locking member slidably mounted on the base for engagement with said indexing openings of said index plate to angularly locate a workpiece thereon and lock it in position, means for moving said locking member into and out of engagement with the indexing openings, a selector plate secured to said shaft at the end opposite to said index plate, with the periphery of said selector plate located in the path of movement of said locking member, a plurality of selector elements angularly displaced around the periphery of said selector plate, and a projection on said locking member for engagement with said selector plate to prevent the entry of said member into an indexing opening except when a selector element is in alignment therewith.

3. A work locating device comprising in combination, a base, a shaft rotatably mounted in said base, an index plate attached to one end of said shaft for the support of a workpiece in any one of a number of angularly displaced positions as determined by the location of a series of angularly displaced indexing openings arranged around the periphery of said index plate, a movable locking member slidably mounted on the base for engagement with said indexing openings of said index plate to angularly locate a workpiece thereon and lock it in position, means for moving said locking member into and out of engagement with the indexing openings, a selector plate secured to said shaft at the end opposite to said index plate, with the plane of said selector plate disposed at right angles to the path movement of said locking member, a plurality of selector elements angularly displaced around the periphery of said selector plate, and a yieldable projection on said locking member for engagement with said selector plate to prevent the entry of said member into an indexing opening, except when said projection is moved by a selector element to disengage it from said plate.

4. A work locating device comprising in combination, a base, a shaft rotatably mounted in said base, an index plate attached to one end of said shaft for the support of a workpiece in any one of a number of angularly displaced positions as determined by the location of a series of angularly displaced indexing openings arranged around the periphery of said index plate, a movable locking member slidably mounted on the base for engagement with said indexing openings of said index plate to angularly locate a workpiece thereon and lock it in position, means for yieldably urging said locking member into said indexing openings, a selector plate secured to said shaft at the end opposite to said index plate, with the plane of said selector plate disposed at right angles to the path of movement of said locking member, a plurality of selector elements angularly displaced around the periphery of said selector plate and projecting therefrom, and a projection on said locking member for engagement with a selector element to prevent the entry of said member into an indexing opening until turning of said selector plate moves a selector element out of engagement with said projection to release said locking member for movement into an indexing opening.

5. A work locating device comprising in combination, a base, a shaft rotatably mounted in said base, a disc-shaped index plate attached to one end of said shaft for the support of a workpiece in any one of a number of predetermined angularly disposed positions, a series of angularly arranged indexing openings in said index plate, said openings being equidistant from said shaft, a locking member mounted on said base parallel to said shaft, one end of said locking member being adapted to slidably and yieldably engage said indexing openings, a disc-shaped selector plate attached to the other end of said shaft and parallel with said index plate, the planes of both of said plates being disposed at right angles to the path of movement of said locking member, a plurality of selector elements angularly disposed around the periphery of said selector plate and adapted to project beyond said periphery, a flange on the other end of said locking member adapted to engage the projecting ends of said selector elements so as to permit entry of said locking member into such indexing openings as are determined by a projection pattern of said selector elements.

6. The device according to claim 5 wherein said locking member is allowed to slide into said openings in direct relation to the projecting elements.

7. The device according to claim 5 wherein said locking member is constrained from sliding into said openings in direct relation to the projecting elements.

References Cited in the file of this patent
UNITED STATES PATENTS

| | | |
|---|---|---|
| 766,793 | Richards | Aug. 2, 1904 |
| 2,458,859 | Kestell | Jan. 11, 1949 |